(12) United States Patent
Kummer

(10) Patent No.: US 7,244,388 B2
(45) Date of Patent: Jul. 17, 2007

(54) PROCESS FOR PRODUCING HOLLOW BODIES OF THERMOPLASTIC MATERIAL AND APPARATUS FOR SAME

(75) Inventor: Wolfgang Kummer, Siegburg (DE)

(73) Assignee: Kautex Maschinenbau GmbH, Bonn (DE)

( * ) Notice: Subject to any disclaimer, the term of this patent is extended or adjusted under 35 U.S.C. 154(b) by 193 days.

(21) Appl. No.: 11/173,123

(22) Filed: Jul. 1, 2005

(65) Prior Publication Data

US 2006/0001197 A1   Jan. 5, 2006

(30) Foreign Application Priority Data

Jul. 1, 2004   (EP) .................................. 04015540

(51) Int. Cl.
*B29C 49/70*   (2006.01)
(52) U.S. Cl. ...................... 264/531; 264/151; 264/163; 425/527
(58) Field of Classification Search ................ 264/531, 264/536, 151, 163; 425/527
See application file for complete search history.

(56) References Cited

U.S. PATENT DOCUMENTS 4,409,177 A * 10/1983 Berth et al. .................. 264/531
4,898,707 A *  2/1990 Arp ........................... 264/515

FOREIGN PATENT DOCUMENTS

DE   1 178 580   9/1964

* cited by examiner

*Primary Examiner*—Suzanne E. McDowell
(74) *Attorney, Agent, or Firm*—Grossman, Tucker, Perreault & Pfleger, PLLC

(57) ABSTRACT

The invention concerns a process and an apparatus for producing hollow bodies of thermoplastic material by means of extrusion blow molding. A tubular preform of plasticised material is expanded beyond parts of a blow molding mold enclosing it, by means of increased external pressure, wherein the preform, prior to closure of the mold halves, is spread transversely with respect to the extrusion direction and in a separation plane of the blow molding mold, in such a way that it extends between the lateral edges of the mold cavity of the blow molding mold. Prior to removal of the article from the blow molding mold, the bulge portion produced after closure of the blow molding mold is cut open along its length at each of the two sides of the mold at the respective edges extending in the extrusion direction.

12 Claims, 4 Drawing Sheets

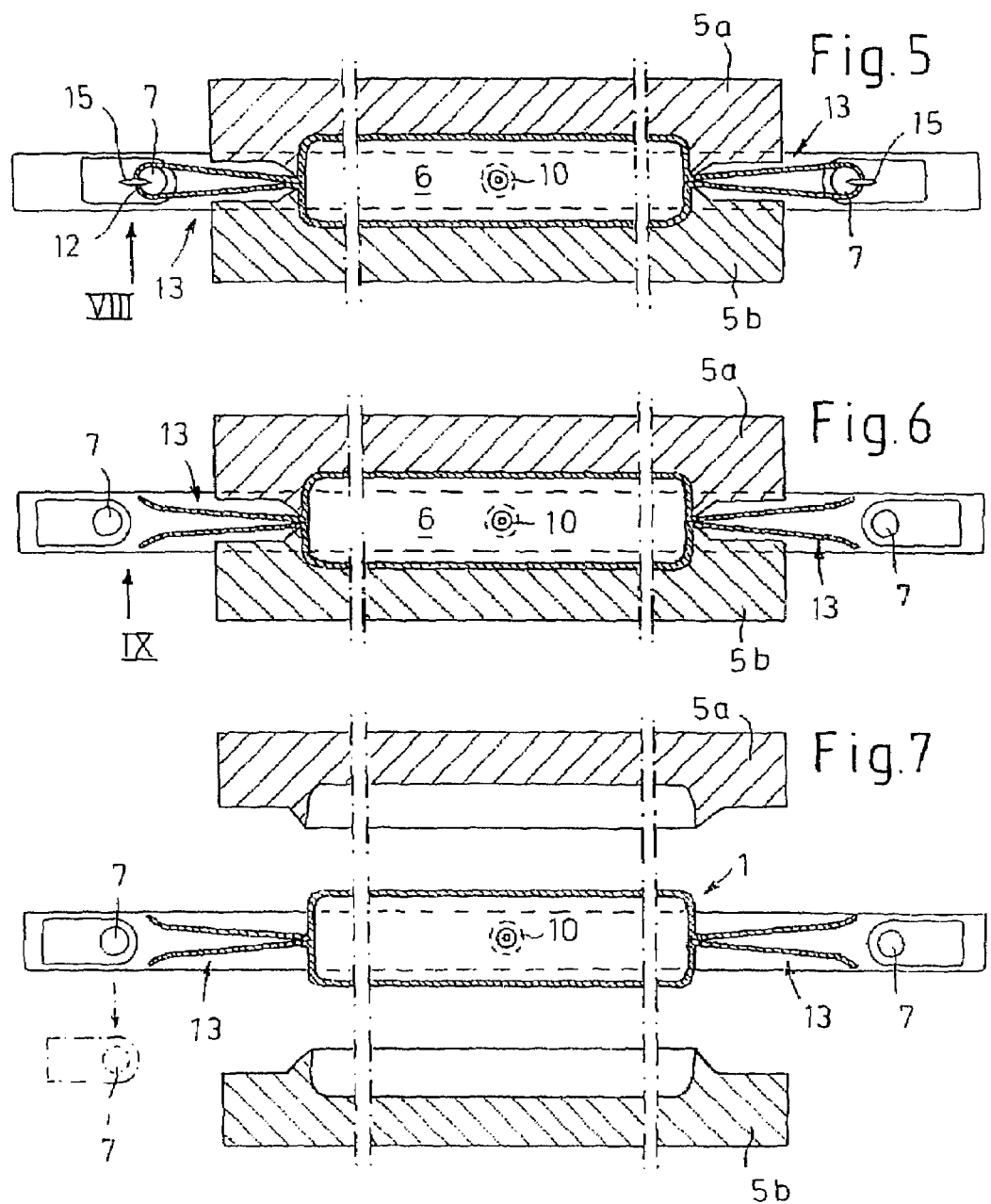

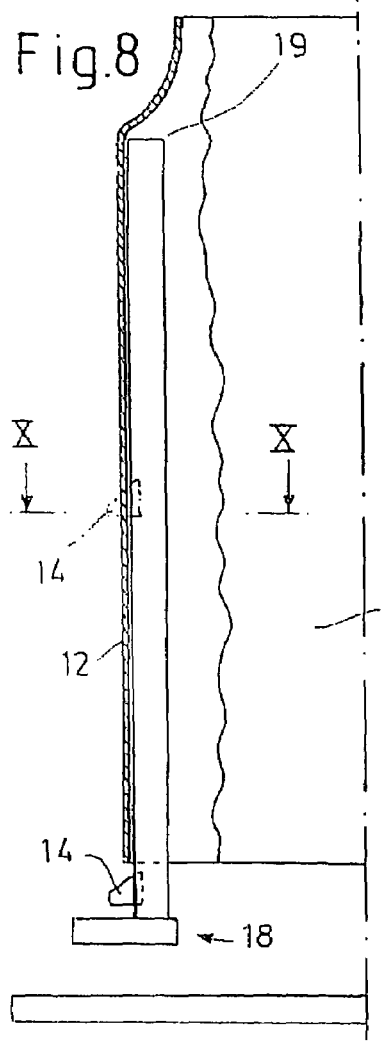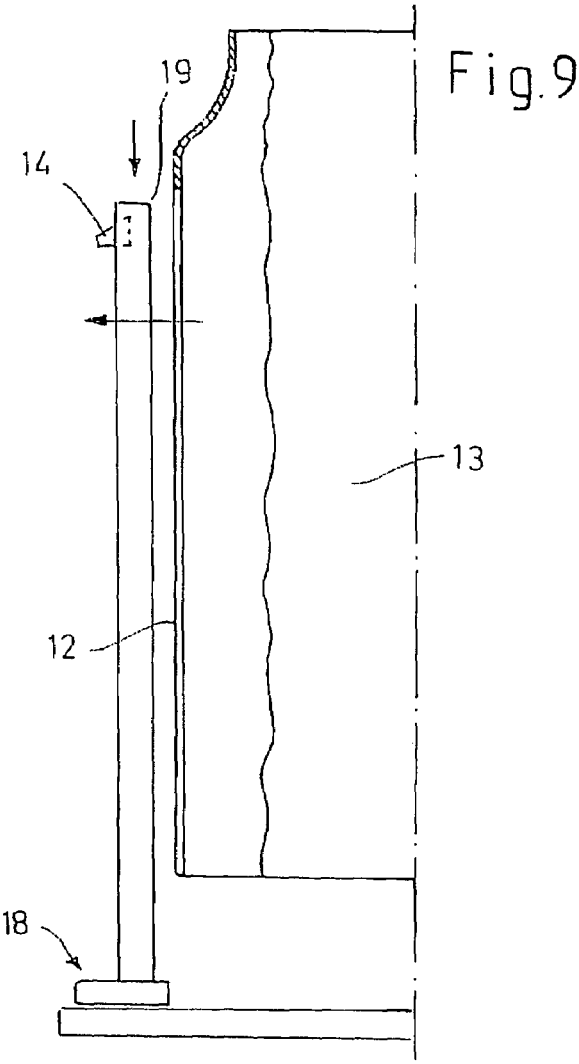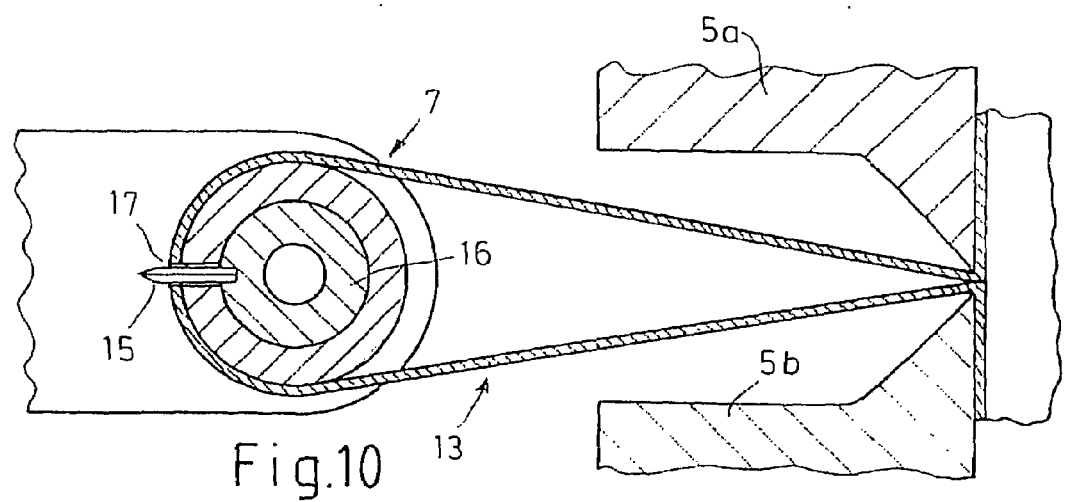

PROCESS FOR PRODUCING HOLLOW BODIES OF THERMOPLASTIC MATERIAL AND APPARATUS FOR SAME

CROSS-REFERENCES TO RELATED APPLICATIONS

This application claims the priority of European patent application No 04015540.0 filed Jul. 1, 2005, the subject-matter of which is incorporated herein by reference.

FIELD OF THE INVENTION

The invention concerns a process for producing hollow bodies of thermoplastic material by extrusion blow molding. The invention further concerns an apparatus for carrying out such a process for producing hollow bodies of thermoplastic material.

BACKGROUND OF THE INVENTION

One form of process for producing hollow bodies of thermoplastic material, as can be found for example in German specification DE-AS No 1 178 580, provides that a tubular preform of plasticised material is expanded between parts of a blow molding mold enclosing the preform, by means of an increased internal pressure within the preform. Prior to closure of the mold halves to constitute the closed mold cavity, the preform is spread transversely with respect to the extrusion direction and in a separation plane of the blow molding mold, so that the preform extends beyond the lateral edges of the mold cavity. With that process, the preform is drawn apart by means of spreading mandrels, immediately prior to closure of the blow molding mold, in such a way that the preform extends substantially over the entire width of the mold cavity before the mold halves are closed. That process is used primarily for producing hollow bodies of a flat cross-section in which the width of the hollow body is a multiple of its depth.

If the production of such articles involves extruding a usual tubular preform of circular cross-section, then expansion of the preform in the blow molding mold entails extremely detrimental distribution of the material in the wall of the finished product as the tube constituting the preform has to be very greatly stretched in one direction during the expansion procedure whereas it undergoes scarcely any stretch at all in a direction perpendicular thereto.

In order to alleviate irregularities which are produced in that fashion in terms of the wall thickness of the finished product, above-quoted DE-AS No 1 178 580 involves spreading the tube constituting the preform prior to closure of the mold halves, in the separation plane of the blow molding mold. That provides that the initial configuration of the tubular intermediate article, which in itself is unsuitable for flat products, is suitably modified prior to the blow molding mold being closed. In this process the tubular preform is initially extruded over spreading mandrels which extend approximately over the entire height of the blow molding mold. Moving the spreading mandrels away from each other transversely with respect to the extrusion direction in the separation plane of the blow molding mold causes the preform to be spread out flat in the desired configuration. The mold halves of the mold are then closed. Prior to removal of the finished article from the mold the spreading mandrels have to be removed again therefrom. For that purpose the spreading mandrels are withdrawn from the bulge portion formed in the molded component outside the mold, in the extrusion direction.

It will be appreciated that this is difficult, particularly when producing large components of a preform length of one meter and more, as an appropriate amount of space has to be provided for the stroke movement to be performed by the spreading mandrels in the extrusion direction, while on the other hand there is a risk that the operation of withdrawing the mandrels after the blow molding mold is closed may take so much time that the material entirely or partially hardens around the spreading mandrels, and that would cause considerable difficulty in withdrawing the mandrels. For that reason the above-outlined process of DE-AS No 1 178 580 has not been put to use in a true practical context.

As an alternative to that procedure the preform can be expanded prior to closure of the blow molding mold, by a pre-blowing procedure.

It will be noted however that, in the production of large blow moldings, that procedure gives rise to problems insofar as a comparatively long period of time is required until the air has escaped from the preform, before the blow molding mold is closed. The larger the blow molding, the correspondingly longer is the cycle time that this entails, and that is not desirable for reasons of cost and in part is not truly practical from the technical point of view.

SUMMARY OF THE INVENTION

An object of the present invention is to provide a process for producing hollow bodies of thermoplastic material by extrusion blow molding, which can be economically carried into effect.

A further object of the present invention is to provide a process for producing hollow bodies of plastic material which involves an operating procedure that is simple to implement and of low susceptibility to operating disturbances.

Yet another object of the present invention is to provide an apparatus for producing hollow bodies of thermoplastic material by extrusion blow molding, which is of a simple structure that also entails a readily implementable set of operating movements.

In accordance with the principles of the present invention in the process aspect the foregoing and other objects are attained by a process for producing a hollow body of thermoplastic material by extrusion blow molding, wherein a tubular preform of plasticised material is expanded between parts of a blow molding mold which encloses the preform, by means of any increased internal pressure in the preform. Prior to closure of the mold halves the preform is laid out flat transversely with respect to the extrusion direction in a separation plane of the blow molding mold, so that the preform extends beyond the lateral edges of the mold cavity defined by the parts of the blow molding mold. Prior to removal of the molded article from the mold, a bulge portion produced after closure of the blow molding mold at each side thereof on the outside of the mold cavity is cut open along its length at its respective edges extending in the extrusion direction.

As will be seen from the description hereinafter of a preferred embodiment of the process of the invention, it is possible in that way for the spreading mandrels to be drawn out of the respective bulge portions immediately after closure of the mold halves by the spreading mandrels being further moved away from each other transversely with respect to the direction of extrusion or by means of an additional stroke movement in the extrusion direction. In that respect the procedure involved counteracts in particular the danger that the thermoplastic material, as it cools and hardens and thus shrinks, will enclose the spreading mandrels in such a way that removal of the spreading mandrels from the article is possible manually only when an additional tool is used for that purpose.

In accordance with a preferred feature of the process of the invention the operation of cutting open the edges of the respective bulge portion is effected by means of cutting devices, while the material forming the bulge portion is still plastic.

In another preferred feature of the invention the cutting operation takes place in opposite relationship to the extrusion direction, that is to say, assuming an extrusion direction downwardly, the cutting operation takes place upwardly.

In another preferred feature the preform is extruded over two preferably bar-shaped spreading mandrels which are moved away from each other prior to closure of the mold in the separation plane thereof transversely with respect to the extrusion direction.

It will be noted that cooling of the spreading mandrels can additionally be provided.

In a further preferred feature of the invention in the process aspect the operation of cutting open the edges of the respective bulge portion can be additionally assisted by further moving the spreading mandrels away from each other after the mold is closed. In that respect there is no need for the spreading mandrels to complete a stroke movement which approximately corresponds to the length thereof but rather the procedure may involve only a slight stroke movement of the spreading mandrels in the extrusion direction, that is to say in their longitudinal direction.

In accordance with the principles of the invention in the apparatus aspect the foregoing and other objects are attained by an apparatus for carrying out the process of the invention, comprising an at least two-part blow molding mold and at least two preferably bar-shaped spreading mandrels, the length of which approximately corresponds to the height of a mold cavity formed by the mold. The spreading mandrels are displaceable relative to each other transversely with respect to the extrusion direction, in the separation plane of the blow molding mold. At least one cutting device is operatively associated with each spreading mandrel and is displaceable in the extrusion direction and/or in opposite relationship to the extrusion direction for the purposes of cutting open the edges of a bulge portion formed outside the mold cavity.

In a preferred feature the cutting device can be for example at least one blade disposed on the blow molding mold, which after closure of the mold halves produces a respective vertical severing cut through the respective bulge portion projecting at the respective side of the blow molding mold.

As an alternative thereto it can be provided that the cutting device is arranged longitudinally displaceably on the respective spreading mandrel, more specifically in a preferred feature in the form of a respective blade.

A preferred configuration of the apparatus according to the invention provides that the blade is fixed to a blade carrier guided displaceably in the interior of the respective spreading mandrel, wherein the blade passes through a guide slot extending longitudinally of the spreading mandrel.

In a further preferred feature the blade is adapted to be heated.

At least one of the spreading mandrels can be movable or pivotable out of the separation plane of the blow molding mold in order to guarantee unimpeded removal of the article from the blow molding mold.

In order to make it easier to remove the spreading mandrels from the bulge portions produced on the article, a preferred feature can provide that the spreading mandrels are adapted to be raised and lowered, the stroke movement thereof being only a small part of the length of the spreading mandrels. That takes account of the fact that the blades which are desirably moved upwardly in the cutting operation are not required to be moved entirely to the end of the spreading mandrels, which is remote from the location at which they are clamped in position.

Further objects, features and advantages of the invention will be apparent from the description hereinafter of a preferred embodiment.

BRIEF DESCRIPTION OF THE DRAWING

FIGS. 5 through 7 are views corresponding to FIGS. 3 and 4, illustrating different cycles in terms of the movements of the blow molding mold and the spreading mandrels, in succession, FIG. 8 shows a view in the direction of the arrow VIII in FIG. 5, FIG. 9 shows a view in the direction of the arrow IX in FIG. 6, and FIG. 10 shows a view in section in the direction of the arrows X—X in FIG. 8.

DESCRIPTION OF THE PREFERRED EMBODIMENT

Figure 1:
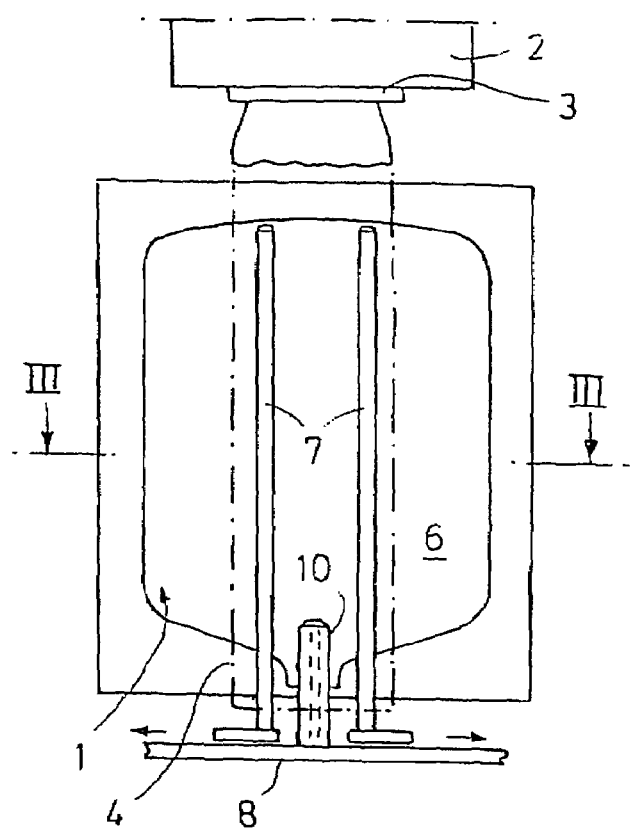
FIG. 1 is a diagrammatic view of an apparatus according to the invention for extrusion blowing in a direction on to a mold cavity of the mold with spreading mandrels disposed in front thereof.
Figure 2:
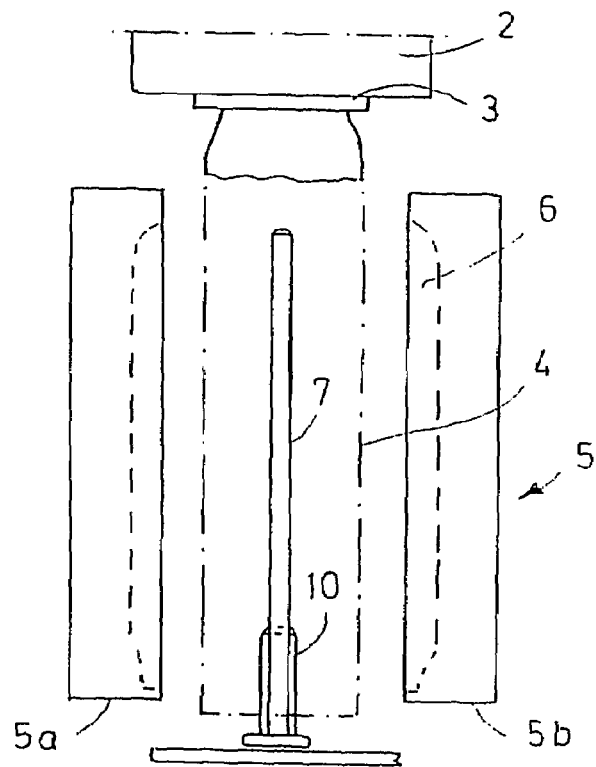
FIG. 2 shows a side view of the apparatus illustrated in FIG. 1.

Reference will first be made to FIGS. 1 and 2 diagrammatically showing an apparatus for extrusion blow molding of hollow bodies or articles 1 of thermoplastic material. In the illustrated embodiment the hollow body or article 1 is a comparatively large component of thermoplastic material whose width is a multiple of its depth. Reference 2 denotes an extrusion head having a nozzle 3 from which firstly a tubular preform 4 of thermoplastic material is extruded in a position of hanging between opened parts or halves indicated at 5a and 5b in FIGS. 3 and 4 of a two-part blow molding mold indicated generally at 5 in FIG. 2. The two halves 5a, 5b of the blow molding mold define a mold cavity 6 therein, the internal contour of which corresponds to the external contour of the finished article 1.

As can be seen from the operating sequence diagrammatically shown in FIGS. 1 and 2, the preform 4 is extruded over first and second spreading mandrels 7 arranged between the halves 5a, 5b of the blow molding mold. The spreading mandrels 7 are preferably of a bar-shaped configuration and approximately correspond in length to the height of the mold cavity 6 and are carried displaceably or slidably on a base 8 disposed beneath the blow molding mold 5. In the position of the spreading mandrels 7 shown in FIG. 1 they are arranged at a spacing from each other in the separation plane of the blow molding mold, in such a fashion that the spacing of the spreading mandrels 7 relative to each other is less than the inside diameter of the tubular preform 4 so that the preform 4 can be extruded over the spreading mandrels 7 without any problem.

Figure 3:
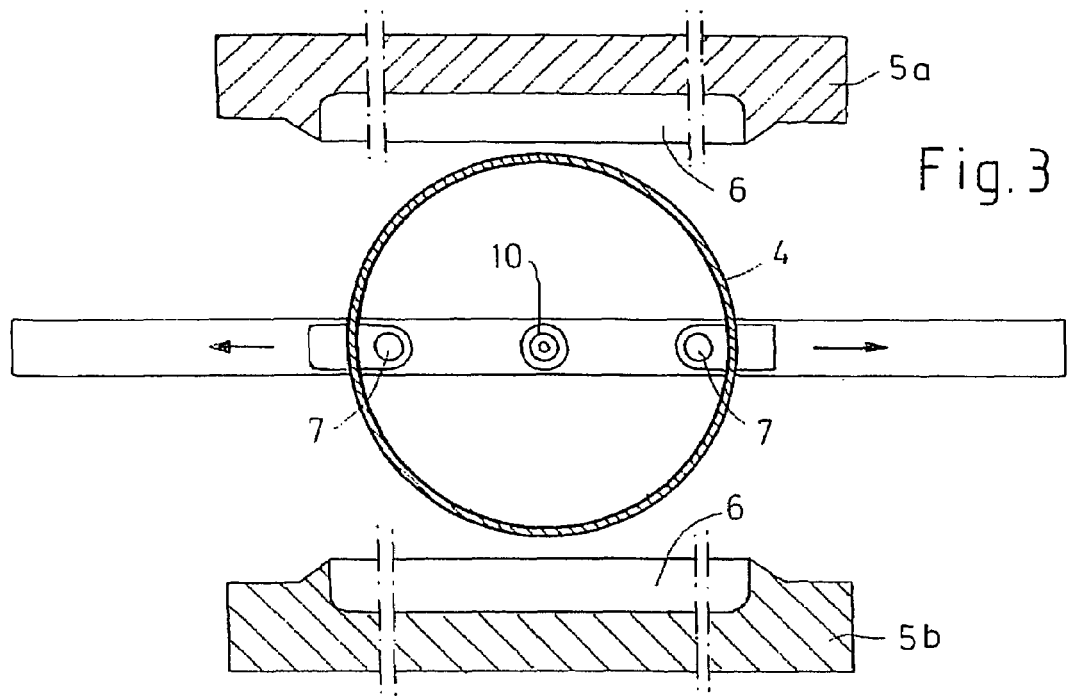
FIG. 3 shows a view in section taken along line III—III in FIG. 1, illustrating a preform extruded over the spreading mandrels which are in the condition of being brought together.
Figure 4:
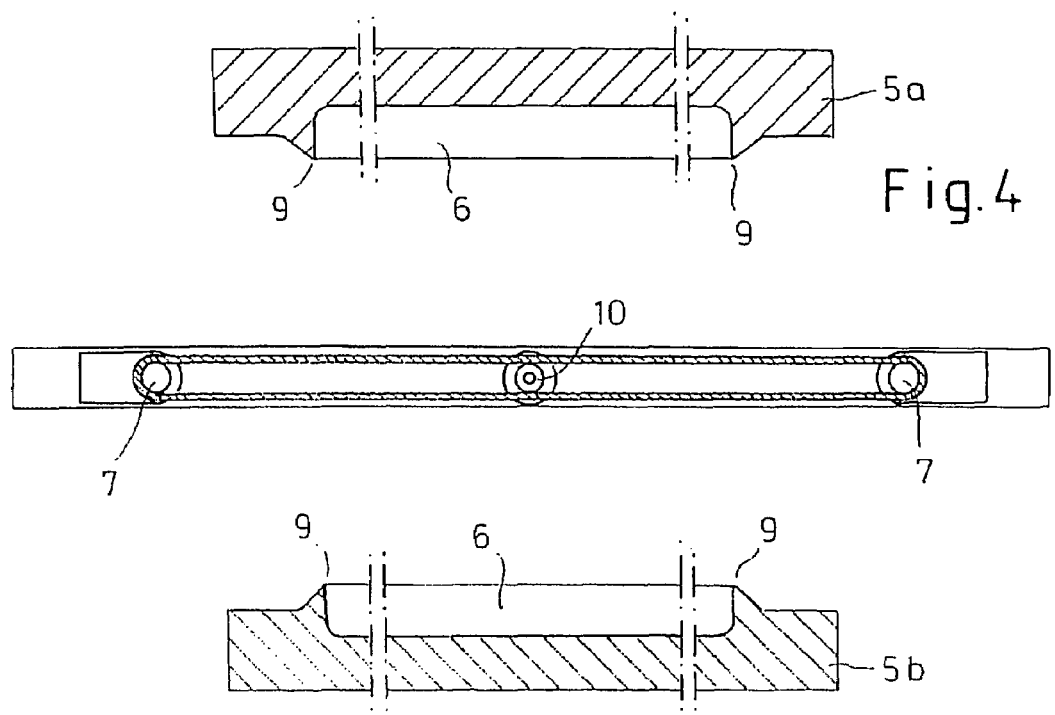
FIG. 4 is a view corresponding to FIG. 3 but with the spreading mandrels in the condition of being moved away from each other.

After the preform 4 has been extruded to its complete length, as is shown in dash-dotted line in FIG. 1, the spreading mandrels 4 are moved away from each other in the separation plane of the blow molding mold 5, transversely with respect to the extrusion direction of the preform 4, more specifically from the position of the spreading mandrels shown in FIG. 3 into that shown in FIG. 4. In the illustrated embodiment, the spreading mandrels 7 are moved away from each other to such an extent that they are disposed outside the closure region of the blow molding mold 5, as can clearly be seen from FIG. 4, so that the preform 4 is laid out flat over the mold cavity 6 and beyond the lateral boundaries of the blow molding mold 5. The preform 4 thus forms two mutually parallel strip portions, once again as clearly shown in FIG. 4. In the described embodiment, the procedure is such that the spreading mandrels 7 only cause the preform 4 to be laid out flat in the condition shown in FIG. 4, that is to say the material is not stretched transversely with respect to the extrusion direction. It will be appreciated however that it is also possible for the material of the preform 4 to be stretched transversely with respect to the extrusion direction, by virtue of an appropriate movement of the spreading mandrels.

The spreading mandrels 7 then hold the preform 4 in the spread-out flat condition shown in FIG. 4, with the spreading mandrels 7 being disposed in that position beside the blow molding mold. The mold halves 5a, 5b of the blow molding mold 5 now close around the preform 4 and enclose it between them. The blow molding mold has squeeze edges indicated at 9 in FIG. 4 which, as can be seen for example from FIG. 5, weld the surfaces of the preform 4 to each other and squeeze off the preform 4 at its edges in relation to each other and also a blowing mandrel indicated at 10 which extends into the mold cavity. The blowing mandrel 10 is provided for introducing a gaseous blowing medium into the preform under pressure so that the preform 4 is appropriately expanded to cause it to come into contact with the inside wall surface of the mold cavity 6.

The preform 4 is then severed from the extrusion head 2 in any appropriate fashion. In parallel therewith, edges indicated at 12 in FIG. 5 of a bulge portion 13 projecting from the blow molding mold 5 laterally at each edge thereof are cut open by a cutting device diagrammatically indicated at 14 in FIG. 8, at each spreading mandrel 7. Associated with each of the spreading mandrels 7 therefore is a respective cutting device 14 which includes a respective blade 15 held within the spreading mandrel 7 in question by a blade carrier indicated at 16 in FIG. 10. The blade carrier 16 is guided longitudinally displaceably within the respective spreading mandrel 7, with the blade 15 thereof passing through a guide slot 17 extending longitudinally of the spreading mandrel 7. The guide slot 17 extends in the longitudinal direction of the respective spreading mandrel 7 approximately from the end 18 thereof which is held in a clamped condition for mounting purposes, to shortly below the end 19 remote therefrom, as indicated in for example FIGS. 8 and 9.

The blade carrier 16 can be displaced axially within the respectively associated spreading mandrel 7 by way of any suitable assembly including for example a pulling element such as a chain or pneumatically or also for example by way of a suitable spindle-nut drive arrangement.

Reference will now be made to FIGS. 8 and 9 which show the sequence of movements involved for cutting open a respective bulge portion 13 at a side of the mold cavity. The respective blade 15 is moved upwardly in the guide slot 17 of the spreading mandrel 7, that is to say in the opposite direction to the extrusion direction which is generally assumed to be downwardly, in which case the part of the blade 15, which projects out of the guide slot 17, cuts open the bulge portion 13 along the length thereof. As the cut produced by the blade 15 does not cut through the entire lateral edge length of the bulge portion 13, the spreading mandrels 7, after the cut has been produced, are lowered by a slight amount, in the extrusion direction, that is to say downwardly. Then, as is shown in FIGS. 6 and 7, the spreading mandrels 7 are further moved away from each other in the separation plane of the blow molding mold 5. In that situation the movement of the spreading mandrels 7 assists with opening up the bulge portion 13 at the separating cut produced by the blade 15, and helps to release the spreading mandrels 7 from the preform 4.

In order to ensure that the article 1 can be reliably removed from the blow molding mold 5, it is then further advantageous if, as is shown in FIG. 7, at least the spreading mandrel 7 is moved out of the separation plane of the blow molding mold 5, for example by a straight movement or by a pivotable movement, at the side of the blow molding mold 5 at which the article 1 in the finished molded condition is removed.

It will be appreciated that it is possible for the operation of separating the bulge portion 13 to be implemented by means of cutting blades or other suitable separation members such as hot wires, which are arranged on the blow molding mold. It is further possible for the separating operation to be effected by means of a separate severing device which is not mold-related and which is not connected to the spreading mandrels. In such cases it would be appropriate for the bulge portion 13 to be cut open in a region between the squeeze edges 9 of the blow molding mold 5 and the longitudinal axis of the respective spreading mandrel 7.

The spreading mandrels 7 do not necessarily have to be moved entirely out of the closure region of the halves 5a, 5b of the blow molding mold, but rather it is possible also to provide suitable recesses for accommodating them in the respective halves 5a, 5b of the blow molding mold 5, outside the mold cavity 6, as is described for example in German specification DE 1 178 580, the content of which is appropriately incorporated herein by reference thereto.

It will be appreciated that the above-described apparatus, and the process for producing a hollow body of thermoplastic material which is carried out thereby, have been set forth solely by way of example and illustration of the principles of the present invention and that further modifications and alterations may be made therein without thereby departing from the spirit and scope of the invention.

What is claimed is:

1. A process for producing hollow bodies of thermoplastic material by extrusion blow molding, wherein
an extruded tubular preform of plasticised material is disposed between parts of a blow molding mold defining a mold cavity for enclosing the preform,
the preform is laid flat prior to closure of the mold halves transversely with respect to the extrusion direction and in a separation plane of the blow molding mold, in such a way that the preform extends beyond the lateral edges of the mold cavity of the blow molding mold, an increased internal pressure is produced within the preform to expand same within the blow molding mold, the parts of the preform extending beyond the edges of the mold cavity constituting bulge portions thereat, and prior to removal of the article from the blow molding mold the bulge portion produced after closure of the blow molding mold is cut open along its length at each side of the blow molding mold at the respective edges extending in the extrusion direction.

2. A process as set forth in claim 1
wherein the operation of cutting open the bulge portion is effected by cutting means as long as the material forming the bulge portion is still plastic.

3. A process as set forth in claim 1
wherein the operation of cutting open the bulge portion takes place in opposite relationship to the extrusion direction.

4. A process as set forth in claim 1
wherein the preform is extruded over two spreading mandrels which are moved away from each other prior to closure of the blow molding mold in the separation plane of the blow molding mold transversely with respect to the extrusion direction.

5. A process as set forth in claim 4
wherein the operation of cutting open the edges of the bulge portion is assisted by further moving the spreading mandrels away from each other after closure of the blow molding mold.

6. Apparatus for producing hollow bodies of thermoplastic material by extrusion blow molding of an extruded preform, comprising an at least two-part blow molding mold defining a mold cavity having a height in the preform extrusion direction, at least two spreading mandrels of a length which at least approximately corresponds to the height of the mold cavity formed by the blow molding mold, means for displacement of the spreading mandrels relative to each other in the separation plane of the blow molding mold transversely with respect to the extrusion direction to spread the preform beyond the mold edges, at least one cutting means operatively associated with each spreading mandrel, and means for displacement of the cutting means in at least one of the extrusion direction and the opposite direction thereto for the purposes of cutting open edges of a bulge portion of said preform at said mold edges.

7. Apparatus as set forth in claim 6
wherein the length of the spreading mandrels corresponds at least to the height of the mold cavity.

8. Apparatus as set forth in claim 6
wherein the cutting means includes at least one blade and means for longitudinal displacement of the blade on the respective spreading mandrel.

9. Apparatus as set forth in claim 8
wherein the spreading mandrel is hollow and has a longitudinally extending guide slot, and wherein the cutting means includes a blade carrier to which the blade is mounted and means guiding the blade carrier displaceably in the interior of the spreading mandrel with the blade passing through the guide slot.

10. Apparatus as set forth in claim 8 including
means for heating the blade.

11. Apparatus as set forth in claim 7 including
means for displacement of at least one of the spreading mandrels out of the separation plane of the blow molding mold.

12. Apparatus as set forth in claim 6 including
means for raising and lowering the spreading mandrels, wherein the stroke movement thereof is only a part of the length of the spreading mandrels.

* * * * *